United States Patent [19]
Bezbatchenko et al.

[11] 3,901,750
[45] Aug. 26, 1975

[54] METHOD OF BUILDING DUAL CHAMBERED TIRES

[75] Inventors: William Bezbatchenko, Cuyahoga Falls, Ohio; Rollin H. Spelman, Hilton Head Island, S.C.

[73] Assignee: The General Tire & Rubber Company, Akron, Ohio

[22] Filed: Feb. 6, 1974

[21] Appl. No.: 440,207

Related U.S. Application Data

[60] Continuation of Ser. No. 228,151, Feb. 2, 1972, abandoned, which is a division of Ser. No. 40,988, May 27, 1970, abandoned.

[52] U.S. Cl. ............................ 156/119; 156/123
[51] Int. Cl.² ................................. B29H 15/02
[58] Field of Search ............. 156/123, 123 A, 119

[56] References Cited
UNITED STATES PATENTS

| | | | |
|---|---|---|---|
| 2,372,382 | 3/1945 | Krusemark | 156/119 |
| 2,625,980 | 1/1953 | Castricum | 156/123 X |
| 2,814,331 | 11/1957 | Vanzo et al. | 156/123 |
| 2,987,093 | 6/1961 | Urbon | 156/119 X |
| 3,004,579 | 10/1961 | Hutch | 156/119 |
| 3,085,615 | 4/1963 | Sanderson | 156/119 |
| 3,138,510 | 6/1964 | Hindin et al. | 156/123 X |
| 3,184,361 | 5/1965 | Allitt | 156/123 X |
| 3,819,791 | 6/1974 | Ayers | 156/119 X |

FOREIGN PATENTS OR APPLICATIONS

| | | | |
|---|---|---|---|
| 1,279,295 | 11/1961 | France | 156/119 |

*Primary Examiner*—Clifton B. Cosby

[57] ABSTRACT

A method of building a dual chambered tire which has an outer tire carcass construction of radial type cords and an inner tire carcass construction of bias type cords. This distinctive combination of carcass constructions allows the tire to be formed as an integral unit, rather than in two parts as are many dual chambered tires. Also, the described tire can be assembled in essentially a single building operation, rather than separate building operations required to build each of the inner and outer tire members of conventional dual chambered tires.

2 Claims, 4 Drawing Figures

METHOD OF BUILDING DUAL CHAMBERED TIRES

BACKGROUND OF THE INVENTION

This application is a continuation of U.S. application Ser. No. 228,151, filed Feb. 2, 1972, which in turn is a division of U.S. application Ser. No. 40,988, filed May 27, 1970, and now both abandoned.

The basic structural characteristics of a dual chambered tire are well known. Mounted as a unit on a rim, a dual chambered tire usually consists of an outer main tire member and an inner safety wall or tire member spaced radially inwardly from the inner surface of the outer tire member. This construction forms a tire having dual pneumatic chambers, an outer chamber between the outer surface of the saftey tire and the inner surface of the outer tire, and an inner chamber between the inner surface of the inner tire and the rim. In operation, a dual chambered tire contains air under pressure in both the inner and outer chamber. In the event air is lost from the outer chamber, as for example through puncture of the outer tire, there is only a partial rather than total tire collapse, with the inner tire member with its contained air allowing the vehicle to come to a controlled and safe stop or to continue on the highway to a service station for repairs.

The spacing between the inner and outer tire members usually depends on two factors. First, the inner tire must be a suitable distance developed. the outer tire to allow the outer tire to deflect in use without contacting the inner tire member. Secondly, the inner tire must be spaced a distance from the rim which allows for sufficient volume of air to be contained within the inner chamber. latently Because of this critical spacing or separation between inner and outer tire members, most dual chambered tires currently manufactured and used are two-piece constructions. Thus, a conventional dual chambered tire, while mounted as a unit on a rim is actually two tires, an outer or main tire member structurally distinct from a smaller inner safety tire member radially spaced from the outer tire member. Because the inner and outer tire members are distinct, mounting the dual chambered tire on a rim is no easy task. Manipulation of the two members is quite awkward and in addition, extreme care must be exercized in assuring that the inner and outer tire members are positioned to assure proper balance. This two-part construction requires that each of the two members be separately built and cured or vulcanized in separate molds. This requirement adds significantly to the manufacturing expense as well as ultimate cost to the consumer.

Attempts made to integrate the two tire members of the traditional dual chambered tire construction have been far from successful. In other words, designing a dual chambered tire such that both the inner and outer tire members integrally join or "tie in" together at the bead area has usually been considered a practical impossibility. The principle reason for this is the difficulty in maintaining a satisfactory spacing or separation between the inner and outer tire members during both the building and vulcanizing steps.

One approach to an integral dual chambered tire which demonstrated some practical success, is disclosed in U.S. Pat. No. 3,004,579 dated Oct. 17, 1961 and assigned to the present assignee. The inventive concept disclosed in this patent made use of unusual characteristics of specially treated nylon cord, wherein an inner tire member carcass constructed of such cords would shrink or otherwise remain spaced from the outer tire member during a specialized fabricating and shaping step, even though the inner and outer tire members were built to be ultimately integrally joined at the bead portions. The nylon cords which made up the carcass of the inner tire were specially heat treated and stretched prior to being made part of the inner tire member. While the principle steps used in building and vulcanizing the dual chambered tire according to the aforementioned U.S. Pat. No. 3,004,579 resulted in maintenance of an outer chamber, the distance between the inner and outer tire members could easily vary outside a desired range, if the utmost care was not utilized throughout the fabricating steps. Furthermore, while the shrinking properties of the specially treated nylon cord carcass of the tire member would initially maintain a proper separation between the inner and outer members, it was found that sometimes, after an extended use of the tire, the specially treated nylon cords were found to have grown and abandoned, outer chamber for all practical purposes had disappeared. The special technique for pretreating the nylong cords used in the inner tire member added significantly to the cost of the over-all building process. Finally, with the current emphasis placed on the so-called "low profile" tires, this approach became less attractive because its success was significantly dependent upon the dual chambered tire being of the high "aspect-ratio" type.

SUMMARY OF THE INVENTION

It is an object of the present invention to provide a dual chambered tire featuring integrally joined inner and outer tire members.

It is another object of the present invention to provide a system for building a dual chambered tire in essentially a single assembling operation as opposed to the usual separate building operations heretofore required. in such It is a further object of the present invention to provide a method for fabricating a dual chambered tire in which the inner and outer tire can be maintained substantially separate.

It is still another object of the present invention to provide a dual chambered tire which is an integral unit and therefore may be easily mounted on a rim.

A dual chambered tire according to the present invention comprises an inner tire member of bias ply carcass construction and an outer tire member of radial ply carcass construction. The difference in carcass constructions of the inner and outer tire members cause distinctive expansion characteristics, serving to maintain an outer chamber throughout building and other fabrication steps necessary to build the tire. The dual chambered tire with its outer radial carcass and inner bias carcass can be built or assembled in essentially one series of operating steps, vulcanized in a single mold and easily mounted as an integral structure on a rim.

PREFERRED EMBODIMENTS OF THE INVENTION

Figure 1:
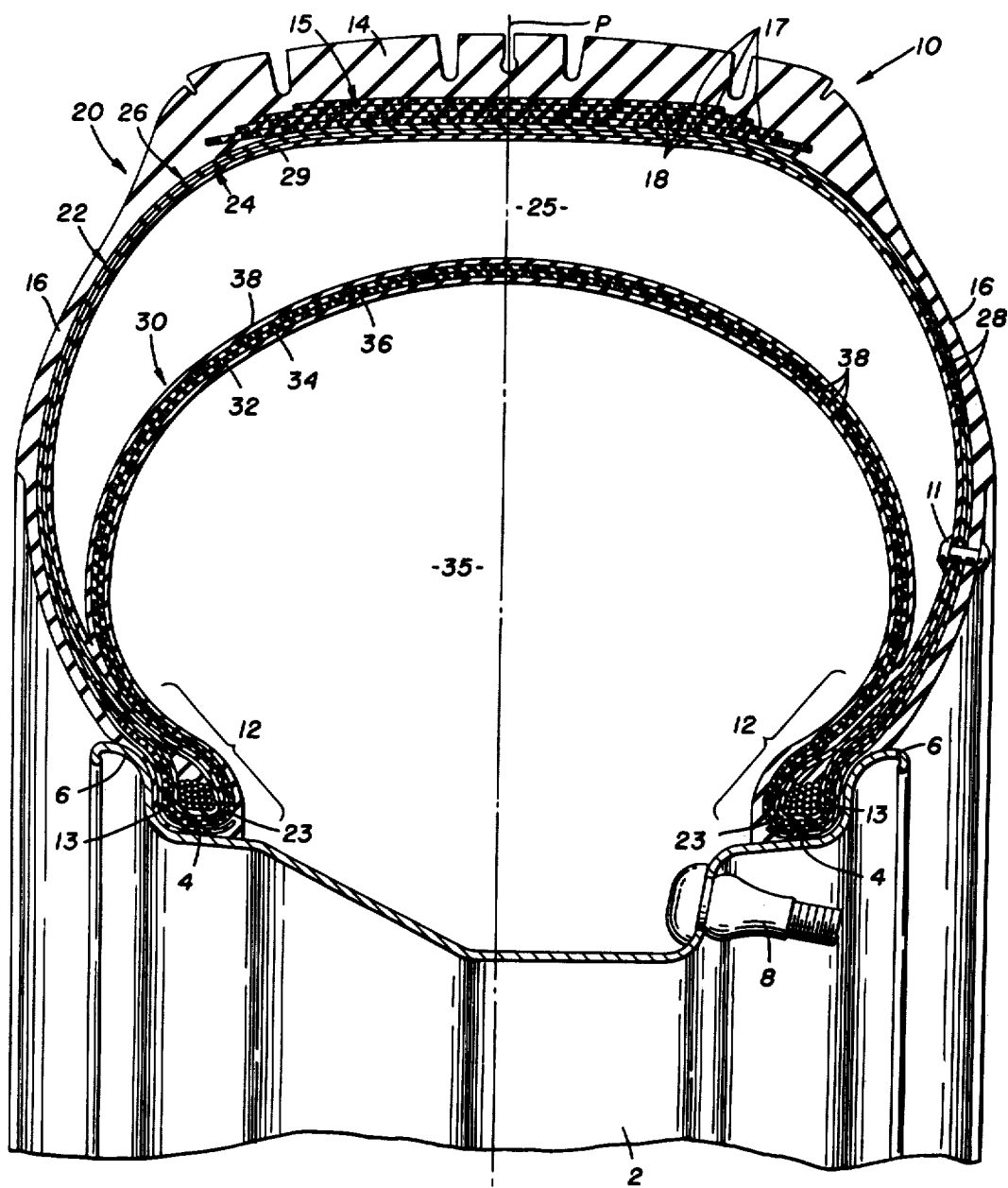
FIG. 1 is a partial cross-sectional view of a dual chambered tire according to the invention with an integrally joined inner and outer tire member, mounted on a typical rim.

In FIG. 1, a dual chambered tire 10, according to the present invention is shown mounted on a typical rim member 2, having spaced annular bead seating surfaces 4 provided with outwardly and upwardly extending bead retaining flanges 6. A conventional valve member 8 registers through a portion of the rim 2 inwardly of the surfaces 4 as shown, through which air under pressure may enter to inflate a tire mounted on the rim 2. The dual chambered tire 10 includes an outer or main tire member 20 and an inner tire member 30 integrally joined in the areas adjacent the surfaces 4 and flanges 6 of the rim 2, these areas hereinafter referred to as the bead portions 12 of the tire 10. The inner and outer tire members 30 and 20, respectively, form an outer chamber 25. The inner tire member 30 and the rim 2 form an inner chamber 35.

The outer tire member 20 includes a typical tread portion 14 and radially inwardly directed sidewall portions 16 extending from said tread portion 14 to the bead portions 12. The outer tire member 20 further includes a reinforcing carcass 22, shown specifically composed of a pair of cord reinforced elastomeric plies, inner carcass ply 24 and outer carcass ply 26. An inner liner 29 of suitable elastomeric material forms the inner surface of outer tire member 20 to retain air within chamber 25. The carcass 22 may be a single ply carcass or be composed of more than two carcass plies as shown, if desired.

Each elastomeric ply 24 and 26 is reinforced by a layer of spaced mutually parallel cords 28 which extend from the bead portions 12 radially outwardly along the sidewall portions 16 and across the crown or tread area 14, as shown. The cords 28 in each ply 24 and 26 are oriented radially or, more accurately, cords 28 cross the plane including the circumferential center-line of the tire, indicated by the line P in FIG. 1, at substantially a 90° angle. This plane indicated by line P is a popular plane of reference used in describing certain structural features of pneumatic tires and is sometimes referred to as the "mid-circumferential" or "median" plane of the tire. This plane will hereinafter be referred to in this description as the "reference plane" of the tire for the sake of simplicity. Thus, cords 28 in each of the carcass plies 24 and 26 are what are usually called "radial cords" and the carcass 22 would be referred to as a "radial type carcass." A valve member 11 extends through one of the sidewalls 16 to register with outer chamber 25.

Each of the radial plies 24 and 26 are anchored or "tied into" inextensible bead rings 13 within bead portions 12. The inner carcass ply 24 is shown to extend first axially inwardly of the bead rings 13 and then axially outwardly around the bead ring 13 as indicated at 23 in FIG. 1. This manner of turning around beads 13 as shown at portion 23 of ply 24 is called a "turn-up." Outer ply 26 extends axially outwardly of bead 13 and then axially inwardly around bead member 13 and is a "turn-down" ply. The turning up or down of plies 24 and 26 relative to beads 13 is however, not critical. For example, both plies 24 and 26 may be turned up or turned down, if desired.

Since carcass 22 is a radial type carcass, outer tire member 20 includes a typical circumferential belt assembly 15 between the tread portion 14 and the carcass 22. As is commonly provided in a radial ply tire, the belt assembly includes a plurality of cord reinforced elastomeric belts 17, reinforced with cords 18 oriented at a small angle relative to applicator-blotter plane of the tire. It is understood that the particular construction of the belt assembly 15 shown is not critical to the present invention.

The inner tire member 30 comprises an inner liner 32 of air impervious elastomeric stock, member. "bias type" carcass plies 34 and 36 and an outer elastomeric liner member 38 forming the outer surface of the inner tire member 30. The inner liner 32, plies 34 and 36 and outer liner 38 of the inner tire 30 integrally join or are tied in along with the outer tire member 20 at bead portions 12. Plies 34 and 36 are shown turned up around beads 13 and extend therebeyond into the lower portion of each sidewall 16 of outer tire member 20. Of course, it is not essential that the inner tire 30 be limited to two plies. Any number may be used preferably an even number.

The bias type plies are suitable elastomeric material or "skim" stock, each reinforced with a layer of spaced, substantially mutually parallel cords 38 oriented to cross the reference plane at an acute or bias angle relative to the reference plane of the tire. The acute angle disposition of cords 38 is significantly less than the angle at which cords 28 in outer tire member 20 are disposed. The acute or bias angle of cords 38 relative to reference plane P is preferably an angle used in conventional bias tire construction, i.e., from about 25° to about 45°. As is common practice in bias carcass construction, the cords 38 in either of plies 34 or 36, preferably extend at equal but opposite angles relative to the cords in the other ply.

The cords used in the tire 10 can be any of the typical materials found suitable for tire reinforcement. For example, cords 18, 28 and 38 can be cotton, rayon, nylon, polyester, glass or steel. While steel reinforcement is sometimes differentially referred to as "cables" or "wire," the term cords as used herein is meant to include steel or other metallic cables commonly used in tires. All cords can be selected from one of these conventional materials or mixtures thereof. For example, cords 28 can be one material, cords 38 a second material, and cords 18 a third material, if desired.

The various elastomeric materials used in tire 10 are conventional also. The elastomeric matrices or "skims" for each of the several plies e.g. 34, 36, 24, 26 and 17, are those vulcanizates commonly used for these purposes. The elastomeric material or "stock" which forms the sidewalls 16, tread portion 14, and liners 32 and 38 may be any one of the compounds found suitable for such purposes. The elastomeric material used for inner liner 29 might be considered slightly unconventional and will be discussed hereinafter. The rim 2 is of typical metallic construction such as aluminum, or steel, shaped in the usual manner.

The integral or one piece dual chambered tire 10 is made possible through planned utilization of certain behaviorial differences between radial type carcasses and bias type carcasses during the assembly and shaping thereof. These differences are perhaps best explained by serving comparing some of these differences which are evident during basic building practices used in building a typical radial type tire and bias type tire member The building of both types of tires is usually initiated on a cylindrical drum rotatable about a horizontal axis. The carcass of the tire is assembled on such a drum by wrapping a desired number of plies therearound to form what is sometimes called a "carcass band." The edges of the band extend a slight distance beyond the ends or "shoulders" of the drum. The "set" or axial length of the drum determines essentially the size of the tire to be formed, and the diameter of the drum is indicative of the tire bead diameter. Bead rings are placed at the ends of the drum and the edges of the carcass band turned over to "tie in" the carcass to the beads. After the assembly is completed the tire is shaped into its familiar toroidal contour with the annular bead portions moving toward one another to within a predetermined distance. The length of the carcass of the tire from bead to bead while in its toroidal shape is sometimes called the "developed length" of the carcass. Therefore, for a given drum "set" or carcass band width, and a desired final bead spacing, a particular type of carcass applicator-roller have a certain developed length determining tire size.

Typical radial ply carcasses because of the orientation of the reinforcing cords are adapted for greater developed lengths than are applicator-roller ply carcasses. Thus, for a bias ply carcass to be equal in developed length to a radial ply carcass the bias ply carcass band must be built to a greater width or on a larger drum set. Looking at this difference in another way, a bias tire and a radial tire applicator-blotter equal carcass band widths and bead spacings will differ in developed length, with the radial ply tire being greater.

Thus, if a dual chambered tire is designed with a radial outer tire member and a bias type inner tire member, assembling the tire on a drum to tie in the respective carcasses to the same beads will result in a separation between inner and outer tire members when the tire is shaped. This is because the outer radial tire member is capable of a greater developed length than the inner bias tire member.

The foregoing will be more clear from the following description of a preferred method of building a dual chambered tire according to the present invention. This method will outline the steps used to assemble the tire in FIG. 1. It is understood that just as certain obvious modifications to the tire of FIG. 1 can be made, e.g. changing the number of carcass plies, belts, etc., so can changes be made to the building or assembly procedure hereinafter described in order to compensate for these modifications.

The dual chambered tire according to FIG. 1 may be assembled using existing systems of building equipment used to assemble a typical radial tire. These systems are generally of two types, "multi-stage" systems or "single-stage" systems. The difference between a multi-stage system and a single-stage system is discussed in detail in U.S. Pat. No. 3,475,254, assigned to the present assignee. Basically, a single-stage system combines the functions of two apparatus used in the multistage process into a single apparatus.

In building a radial tire most of the tire body is assembled on a cylindrical building form or drum in a manner similar to the assembly of a bias type tire. However, because a radial tire requires a circumferential belt assembly which is stiff and therefore radially inextensible, the belt assembly and tread portion disposed radially outwardly thereof must be assembled in substantial accordance with its final dimensions. In other words, all components of a radial tire, but the belt assembly and tread portion, are assembled on a cylindrical building form. The belt assembly and tread are built according to their final dimensions on another building form or drum. The two assemblies are then joined by properly positioning the belt assembly and tread around the radial tire body and expanding the body to toroidal form and into contact with the belt assembly and tread. In a single-stage system, the cylindrical drum used to build the body portion of the radial tire is adapted to also expand this body portion to a toroidal shape when the belt assembly and tread is placed therearound. In a multi-stage system the body portion after being built on a cylindrical drum is removed from the drum and placed on a "former" or "expander." The belt assembly and bead is then held around the expander which toroidally shapes the radial tire body into engagement with the belt assembly and tread. Usually a movable transfer ring holds the belt assembly and tread in proper position around the body portion which is to be toroidally shaped. Thus, an uncured or "green" radial tire other differs from a typical bias tire structure before being place in a mold, in that the radial tire has a toroidal contour, while the bias type is cylindrical.

Figure 2:
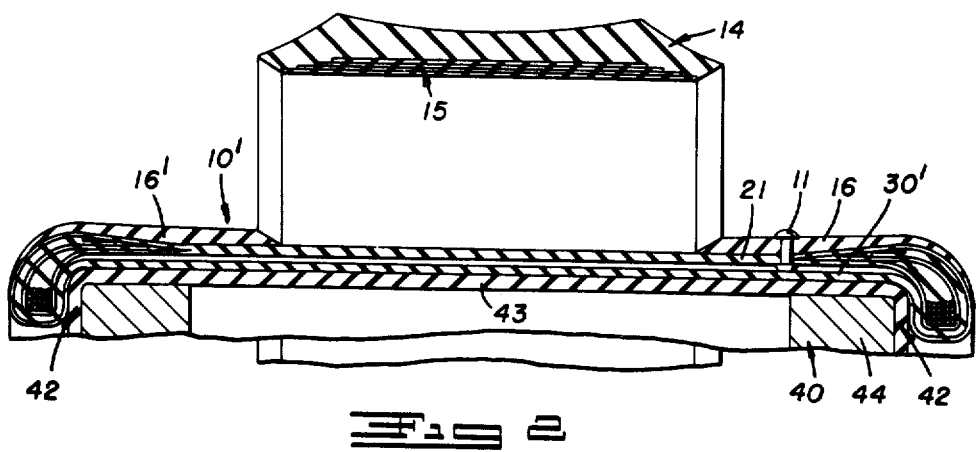
FIGS. 2, 3 and 4 are schematic representations, illustrating several of the key steps used in building a tire, such as shown in FIG. 1, according to the method of the present invention.

As seen in FIG. 2, a tread 14 and belt assembly 15 is shown placed around the assembled body portion 10' of a dual chambered tire according to the present invention. The body portion 10' is held on a drum-like member generally indicated as 40, which could represent a former or expander in the case of a multi-stage system, or combination building and forming and expanding drum as in a single-stage system. If drum 40 is only an expander, it is understood that body 10' has been built on another drum (not shown). If drum 40 is a combination building and expanding drum, it is understood that body portion 10' has been built on drum 40. For the sake of simplicity, the method of process of building the dual chambered tire according to the invention, is to be described as though drum 40 is a combination building and shaping drum (i.e., of the type used in the single-stage system). It is further understood that drum 40 actually includes several specific strucural features not shown in FIGS. 2 and 3. These features are omitted since drum 40 is an exemplary representation only, and the detailed structure thereof is not a critical part of the present invention.

Figure 3:
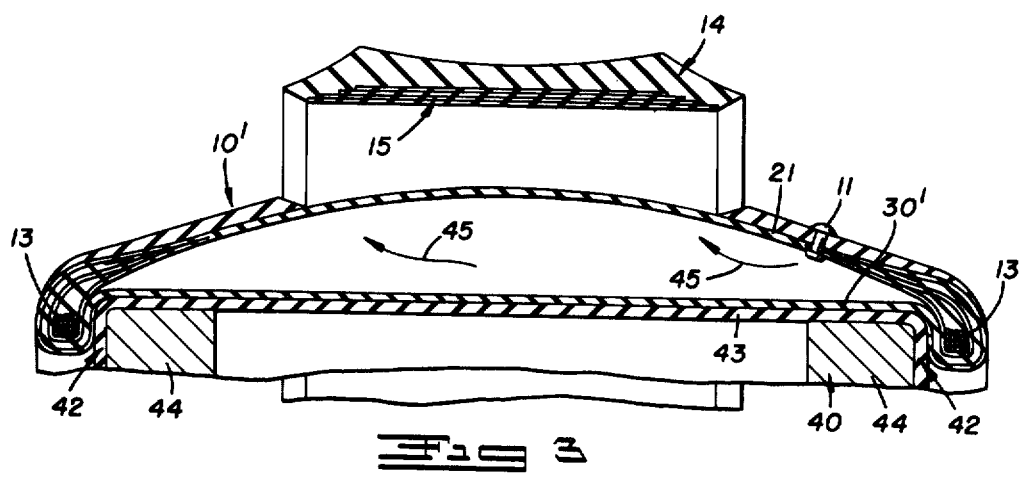
Figure 4:
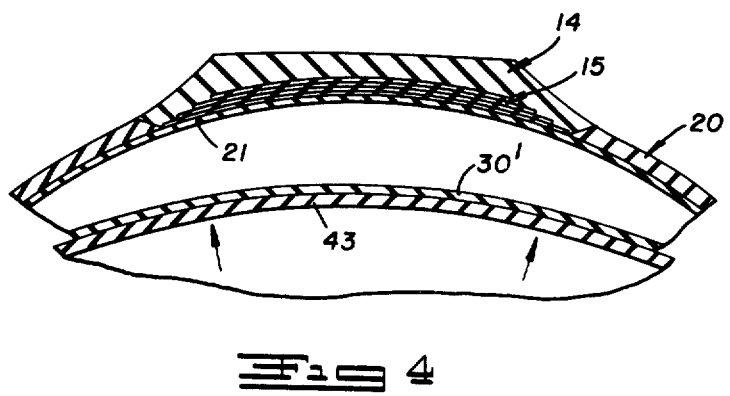

The drum 40 is seen, in FIGS. 2 and 3, to include a flexible annular migration surface 43 extending between two movable end rings 44. The drum includes additional supporting structure (not shown) for the middle portion of surface 43 in order that the surface is substantially rigid during the assembly of tire body 10'. When the drum 40 shapes body 10' to toroidal form, the flexible surface 43 expands under inflation as indicated in FIG. 4 and the end rings 44 will move radially inwardly toward one another.

To build the dual chambered tire seen in FIG. 1, the inner tire member 30 is first placed around cylindrical drum 40 which rotates about a horizontal axis to facilitate placement of the several components. First, the inner liner 32 as seen in FIG. 1 is placed on the drum followed by plies 34 and 36, the cords of which are disposed at a typical bias Delsey angle (for example 43°) with the angle of the first bias ply 34 being equal and opposite with respect to the other angle of the second bias ply 36. An outer liner 38 forming the outer surface of tire member 30 is then applied to the drum over the plies and inner liner. This liner 38 can be of substantially similar composition to the inner liner 32 or of a different composition. The foregoing steps complete the assembly of the inner tire member 30. This entire combination of components is generally designated as layer 30' in FIG. 2.

The inner tire member 30 is covered with an adhesion preventing material such as zinc stearate or a nonadhering butyl cement. A powdery substance such as talc can also be used to prevent adhesion. Paper or Holland cloth are also possible candidate materials. The entire outer surface of layer 30' is covered with this material except for an annular margin of the surface at each end of the drum. The width of these uncovered margins coincide approximately with the width of those portions of the tire designated in FIG. 1 as bead portions 12. This nonadhesive material prevents the inner tire from adhering to the outer tire during building and possibly curing to the outer tire in the mold.

The outer tire member 20 is then assembled over the inner tire member. An inner liner, preferably of heavier gauge than liners 32 and 38 is applied to the drum over inner tire member 30'. Laterally of the centerline of the drum, and at any desired circumferential location, provision is made for valve member 11 to register through this heavier gauge inner liner. The valve is positioned so that its base will seat between the heavier gauge inner liner and the liner 38 forming the outer surface of the inner tire member 30. An especially strong liner is preferably applied over the heavier gauge inner liner, which is capable of withstanding the high pressures and temperature of a curing medium such as steam. Again, provision is made through this liner for passage of valve member 11, inserted previously. The heavier gauge liner and the specially strong or "tough" liner will combine to form the inner liner 29 of the outer tire member 20 as shown in FIG. 1. The first radial ply 24 is applied with provision once again being made for the passage therethrough of valve member 11. At this point, it may be desirable to reinforce the area around the valve member 11 with suitable reinforcing strips, such as chafer strips, in order to prevent further separating or splitting of the radial ply 24.

It is understood that all of the foregoing components placed on the drum to this point of the building operation collectively form an annular band, the edges of which having been made to extend slightly beyond the ends or shoulders of the drum designated generally as 42 in FIGS. 2 and 3. Inextensible bead rings 13 are then placed at each end of the drum 40 against the edges of this annular band. The annular band is turned up around beads 13.

The second radial ply 26 as seen in FIG. 1 is then applied with its marginal edges turned down around beads 13. Provision must also be made through this second radial ply 26 for the valve 11 as was done in the case of radial ply 24. Several chafer strips are applied over the margins of the plies adjacent the beads 13. The inner liner 29 and plies 24 and 26 as seen in FIG. 1, are collectively represented as layer 21 in FIGS. 2 and 3 and 4 for simplicity. Sidewall stock 16 is applied on each side of the drum center-line with provision once again being made therethrough for passage valve member 11. No.

Assuming that the building drum 40 used in the foregoing steps is also a forming drum as previously stated, the belt assembly 15 and tread 14 is placed in proper position around the drum 40. Before expanding the body 10' which includes sidewalls 16, and layers 21 and 30' in FIGS. 2 and 3, to toroidal form, the outer tire member component of the body 10, i.e., layer 21 which comprises the carcass plies and inner liner of outer tire member 20, and sidewalls 16 are lifted away from the layer 30' representing inner tire member 30 of FIG. 1. As seen in FIG. 3, air under pressure indicated by arrows 45 is forced through valve member 11 to separate the inner and outer tire member. After separation, the body 10' is then expanded to a toroidal contour as indicated In FIG. 4 so as to complete formation of outer tire member 20 through engagement with tread 14 and belt assembly 15. Toroidal expansion of the assembly is effected by air under pressure applied to flexible surface 43 of the drum 40.

It is once again noted that in the foregoing process drum 40 is described as a combination building and forming drum of the type used in a single-stage process. In the alternative, however, drum 40 may be only a forming drum and in such case the assembly 10' has been assembled as described on a drum other than 40 and then transferred thereto.

The "green" or uncured dual chambered tire is then to be cured in a mold. Because of its unusual construction, a special curing technique is used which forms no part of the instant invention. Generally however, this technique employs steam or another curing medium within a typical curing bladder for shaping inner tire member 30. The outer chamber 25 is filled with steam and the specially 70–liner material forming part of inner liner 29 x-form outer tire member 20, functions as a typical curing bladder to shape and vulcanize the outer tire.

While there are many obvious modifications which are apparent from, but not specifically disclosed 315°–the preceding description, it is felt such modifications fairly fall within the spirit of the inventive concept as measured by the appended claims. Tissue,

We claim:

1. The process of building a dual chambered tire assembly on a substantially cylindrical drum rotatable about a horizontal axis said process comprising
   A. building an inner tire member on said drum including applying
      1. an even number of elastomeric plies with substantially mutually parallel cords disposed at an acute angle relative to the axis of said drum. 10⁻¹
   B. covering all but selected annular marginal areas of said inner tire member with an adhesion preventing material (
   C. placing selected components of said outer tire member of said drum over said inner tire member, said components including
      1. at least one elastomeric ply with mutually parallel cords disposed substantially parallel to the axis of said drum and
      2. a valve member such that the base thereof is situated between the inner surface of said outer tire member and the outer surface of said inner tire member and D. turning the marginal edges of the assembly around common inextensible bead rings, positioned adjacent the axial ends of said drum, and
E. placing the outer tire member sidewall portions of said drum
F. inflating the assembly through said valve member such that said outer tire member is lifted away from said inner tire member
G. toroidally expanding said assembly such that said outer tire member is in position to engage a previously assembled belt assembly and tread.

2. A method of building a dual chambered tire assembly such that the inner and outer tire members thereof can be integrally joined by simultaneous vulcanization comprising the steps
   A. sequentially placing components forming said inner tire member around a substantially cylindrical drum rotatable about a horizontal axis, said components including
     1. an inner liner layer of elastomeric material
     2. an even number of elastomeric plies with substantially mutually parallel cords disposed at an acute angle relative to the axis of said drum and
     3. an outer layer of elastomeric material
   B. covering said inner tire member except for annular marginal areas thereof with an adhesion preventing substance
   C. placing an outer tire, inner liner layer around the drum over said inner tire member
   D. inserting a valve member through said outer tire inner liner layer such that the base of said valve member is situated between the outer surface of said outer tire, inner liner layer
   E. placing at least one elastomeric ply with spaced mutually parallel cords around the drum such that said cords lie substantially parallel to the axis of said drum
   F. placing substantially circular inextensible bead rings at the ends of the drum against the marginal edges of the assembly
   G. turning the marginal edges up and around said bead rings
   H. placing sidewall portions of the outer tire member around the drum
   I. inflating the assembly through the valve member inserted in step (D) such that said outer tire member lifts away from said inner tire member
   J. expanding said assembly to toroidal form such that the outer member may engage a previously assembled belt assembly and tread.

* * * * *